United States Patent
Iannone et al.

(10) Patent No.: US 10,573,297 B2
(45) Date of Patent: Feb. 25, 2020

(54) SYSTEM AND METHOD FOR DETERMINING THE COMPLIANCE OF AGENT SCRIPTS

(71) Applicant: Verint Systems Ltd., Herzilya Pituach (IL)

(72) Inventors: Jeffrey Michael Iannone, Alpharetta, GA (US); Ron Wein, Ramat Hasharon (IL); Omer Ziv, Ramat Gan (IL)

(73) Assignee: Verint Systems Ltd., Herzilya Pituach (IL)

(*) Notice: Subject to any disclaimer, the term of this patent is extended or adjusted under 35 U.S.C. 154(b) by 0 days.

(21) Appl. No.: 15/217,277

(22) Filed: Jul. 22, 2016

(65) Prior Publication Data

US 2016/0329049 A1 Nov. 10, 2016

Related U.S. Application Data

(63) Continuation of application No. 14/319,847, filed on Jun. 30, 2014, now Pat. No. 9,412,362.

(60) Provisional application No. 61/870,844, filed on Aug. 28, 2013.

(51) Int. Cl.
| | |
|---|---|
| *G10L 15/10* | (2006.01) |
| *G10L 15/08* | (2006.01) |
| *G10L 15/04* | (2013.01) |
| *G10L 15/06* | (2013.01) |
| *G10L 15/26* | (2006.01) |

(52) U.S. Cl.
CPC ............. *G10L 15/10* (2013.01); *G10L 15/04* (2013.01); *G10L 15/06* (2013.01); *G10L 15/08* (2013.01); *G10L 15/26* (2013.01); *G10L 2015/0635* (2013.01); *G10L 2015/088* (2013.01)

(58) Field of Classification Search
CPC ......... G10L 15/22; G10L 15/30; G10L 15/18; G10L 15/183; G10L 15/1815; G10L 15/26; G10L 17/22; G10L 15/005; G10L 13/08; G10L 15/08; G10L 15/19; G10L 2015/025; G10L 13/00; G10L 2015/088; G10L 25/48; G10L 15/265; G10L 15/02; G06F 17/27; G06F 17/2715; G06F 17/2785; G06F 17/2775
USPC ..... 704/1–10, 235, 260, 231, 243, 251, 270, 704/254, E15.005, E15.04, E15.018, 704/E15.001
See application file for complete search history.

(56) References Cited

U.S. PATENT DOCUMENTS

| | | | | |
|---|---|---|---|---|
| 5,634,086 A * | 5/1997 | Rtischev | ................ | G09B 19/06 434/185 |
| 8,185,400 B1 * | 5/2012 | Goffin | .................... | G10L 15/22 704/233 |
| 8,880,398 B1 * | 11/2014 | Aleksic | .................. | G10L 15/30 704/235 |

(Continued)

FOREIGN PATENT DOCUMENTS

JP 2004302175 10/2004

*Primary Examiner* — Dwayne D Bost
*Assistant Examiner* — Stephen M Brinich
(74) *Attorney, Agent, or Firm* — Christopher M. Scherer; DeWitt LLP

(57) ABSTRACT

Systems and methods of script identification in audio data obtained from audio data. The audio data is segmented into a plurality of utterances. A script model representative of a script text is obtained. The plurality of utterances are decoded with the script model. A determination is made if the script text occurred in the audio data.

18 Claims, 4 Drawing Sheets

(56) References Cited

U.S. PATENT DOCUMENTS

| | | | |
|---|---|---|---|
| 2002/0077819 A1* | 6/2002 | Girardo | G10L 25/69 |
| | | | 704/260 |
| 2002/0143548 A1 | 10/2002 | Korall | |
| 2004/0162724 A1 | 8/2004 | Hill | |
| 2006/0271838 A1 | 11/2006 | Carro | |
| 2007/0067172 A1 | 3/2007 | Lee | |
| 2010/0093319 A1* | 4/2010 | Sherman | H04M 3/42178 |
| | | | 455/414.1 |
| 2011/0276325 A1 | 11/2011 | Tatum | |
| 2013/0238321 A1* | 9/2013 | Tamura | G06F 17/27 |
| | | | 704/9 |

* cited by examiner and SYSTEM AND METHOD FOR DETERMINING THE COMPLIANCE OF AGENT SCRIPTS

CROSS-REFERENCE TO RELATED APPLICATION

The present application is a continuation of U.S. patent application Ser. No. 14/319,847, filed Jun. 3, 2014, which application was published on Mar. 5, 2015, as US2015/0066504, and which further claims priority of U.S. Provisional Patent Application No. 61/870,844, filed on Aug. 28, 2013, the contents of which are hereby incorporated herein by reference in their entireties.

BACKGROUND

In an exemplary embodiment of a customer service call center, some customer service interactions between a customer and a customer service agent may require that the customer service agent convey scripted information to the customer. One non-limiting example of such a script may be a legal notice. Still other non-limiting examples of scripted information may include ordering directions, product descriptions, or a list of on sale items or current promotions.

Typically accuracy of script identification audio data is correlated to the length of the script. Namely, if a string of multiple words that make up a script can be identified in audio data, there is a strong likelihood that this is due to the delivery of a script by the agent and not organically occurring by chance. However, speech-to-text transcriptions, especially transcriptions performed as part of an initial audio data processing or used for real-time analysis of streaming audio data, have comparatively low accuracies in transcribing the audio data. In such embodiments, transcriptions may be 50-70% accurate. These inaccuracies in the transcription may result in scripts going unidentified or misidentified.

BRIEF DISCLOSURE

An exemplary embodiment of a method of script identification in audio data includes obtaining audio data. The audio data is segmented into a plurality of utterances. A script model representative of a script text is obtained. The plurality of utterances are decoded by applying the script model to the plurality of utterances. A determination is made if the script text occurred in the audio data from the decoded plurality of utterances.

An exemplary embodiment of a non-transient computer readable medium programmed with computer readable code that upon execution by a computer processor causes the computer processor to identify script in audio data. The processor obtains audio data. The audio data is segmented into a plurality of utterances. The processor obtains a script model that is representative of a script text. The plurality of utterances are decoded by the processor by applying the script model to the plurality of utterances. A determination is made if the script text occurred in the audio data from the decoded plurality of utterances.

An exemplary embodiment of a system for identification of a script in audio data includes an audio data source. A script model database includes a plurality of script models. Each script model of the plurality is representative of at least one script text. A processing system is communicatively connected to the script model database and the audio data source. The processing system obtains audio data from the audio data source and segments the audio data into a plurality of utterances. The processing system obtains at least one script model from the script model database and decodes the plurality of utterances by applying the script model to the plurality of utterances. The processing system determines if the script text occurred in the audio data from the decoded plurality of utterances. Based upon the determination, the processing system initiates a remedial action if the script text did not occur in the audio data.

DETAILED DISCLOSURE

In the field of audio data analysis, the identification of scripts or specific sequences of words may be desired. In an exemplary embodiment, in a customer service call center setting, the customer service agent may be provided with a plurality of scripts that are written to convey specific information to the customer. Such scripts may convey information required by law or regulation, may be identified by a company as a best practice, or may be a script specifically designed to convey important information to customers such as products or services for sale, prices, promotions, or available options. Therefore, it is desirable in the field of audio data analysis to identify if scripts occur in audio data. In further embodiments, it is desirable to evaluate the accuracy with which the script was delivered, or to evaluate the context or timing of the delivery of the script.

Figure 1:
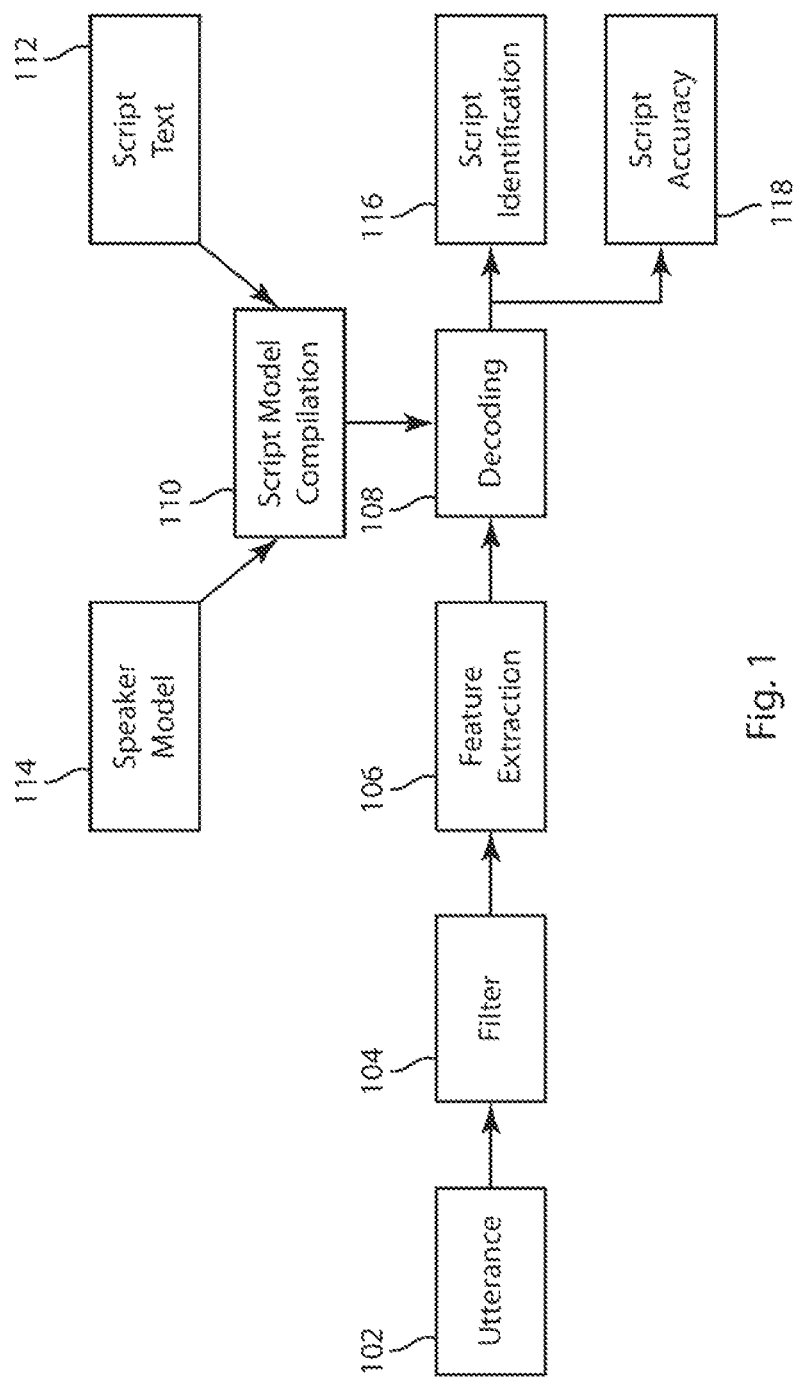
FIG. 1 is a flowchart that depicts an exemplary embodiment of a method of script identification.
Figure 2:
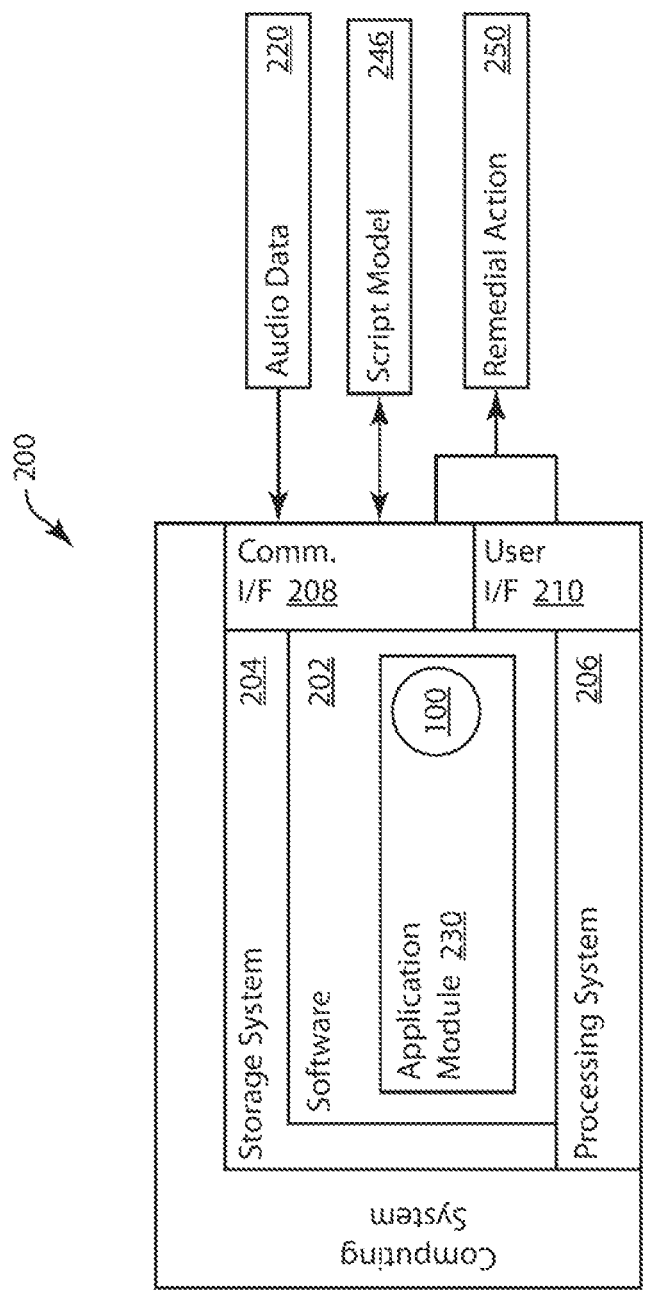
FIG. 2 is a system diagram of an exemplary embodiment of a system for script identification.

FIG. 1 is a flow chart that depicts an exemplary embodiment of a method 100 of script identification. FIG. 2 is a system diagram of an exemplary embodiment of a system 200 for script identification. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100, as in further embodiments in accordance with the method 400 described herein with respect to FIG. 4.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. Processing system 206 can be implemented within a single processing device but can also be distributed across multiple processing devices or subsystems that cooperate in existing program instructions.

Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives and transmits data through communication interface 208. In embodiments, the communication interface 208 operates to send and/or receive data to/from other devices to which the computing system 200 is communicatively connected. In the computing system 200, audio data 220 is received at the communication interface 208. The audio data 220 may be an audio recording or a conversation, which may exemplarily be between two speakers, although the audio recording may be any of a variety of other audio records, including multiple speakers, a single speaker, or an automated or recorded auditory message. In a further exemplary embodiment, the audio data is a customer service interaction between a customer and a customer service agent. The audio file may exemplarily be a .WAV file, but may also be other types of audio files, exemplarily in a pulse code modulation (PCM) format and an example may include linear pulse code modulated (LPCM) audio file. Furthermore, the audio file is exemplary a mono audio file; however, it is recognized that embodiments of the method as disclosed herein may also be used with stereo audio files. In still further embodiments, the audio file may be streaming audio data received in real time or near-real time by the computing system 200. The processing system 206 obtains at least one script model as described in further detail herein from a script model database 240. In further exemplary embodiments, the processing system 206 may compile a script model which is then stored at the script model database 240 for later use. If the processing system 206, upon execution of the application module 230 identifies a non-existent, or non-compliant script, the processing system may initiate a remedial action 250 which may exemplarily be output on a graphical display of the user interface 210 or a communication to another device across communication interface 208.

FIG. 1 is a flowchart that depicts an exemplary embodiment of a method 100 of script identification. The method 100 receives audio data, exemplarily in the form of a streaming mono .WAV file. In an embodiment, the script identification is performed in real-time while in other embodiments, the script identification is performed on previously recorded audio data. In an embodiment, the audio data undergoes voice activity detection in order to segment the audio data into a plurality of utterances 102. The utterances 102 are exemplarily segments of the audio data that are likely to be speech separated by segments that are likely to be non-speech.

In an embodiment, at 104, the utterances at 102 may be optionally filtered in order to focus the script analysis to a subset of the utterances which are likely to include the script or be of particular interest for the script to be identified. In exemplary embodiments, such filtering at 104 may filter the utterances at 102 such that only utterances attributed to the customer service agent are processed. In another embodiment, the utterances are filtered such that only utterances from a particular time range are processed for script detection, while in a still further exemplary embodiment, the utterances are filtered to only process those utterances that have already been identified, potentially by another system, or by a manual input by a manger as potentially including a script.

At 106 features are extracted either from the full set of utterances 102 or a filtered and reduced set of utterances from 104. In acoustic feature extraction at 106, one or more acoustic features are identified for each of the utterances. In a merely exemplary embodiment, the extracted acoustic features are Mel-frequency cepstrum coefficients (MFCCs). The MFCC are a type of cepstral representation of the utterance. Therefore the MFCCs are specific representations of the spectrum of the utterance and can be used to model a spectral envelope of the utterance. The MFCCs or other extracted acoustic features can help to distinguish between speakers and can also help to distinguish phonemes in the utterance.

Next, at 108, the segmented utterances and extracted features undergo a decoding process to identify scripts in the utterances. The decoding at 108 applies a script model compilation 110 to the utterances. In a non-limiting embodiment, the decoding may be performed using the Viterbi algorithm to apply the one or more models to the audio data. The Viterbi algorithm is described in Viterbi A. J., "Error bounds for convolutional codes and an asymptotically optimum decoding algorithm". *IEEE Transactions on Information Theory* 13(2): 260-269 (1967), which is hereby incorporated by reference in its entirety.

Figure 3:
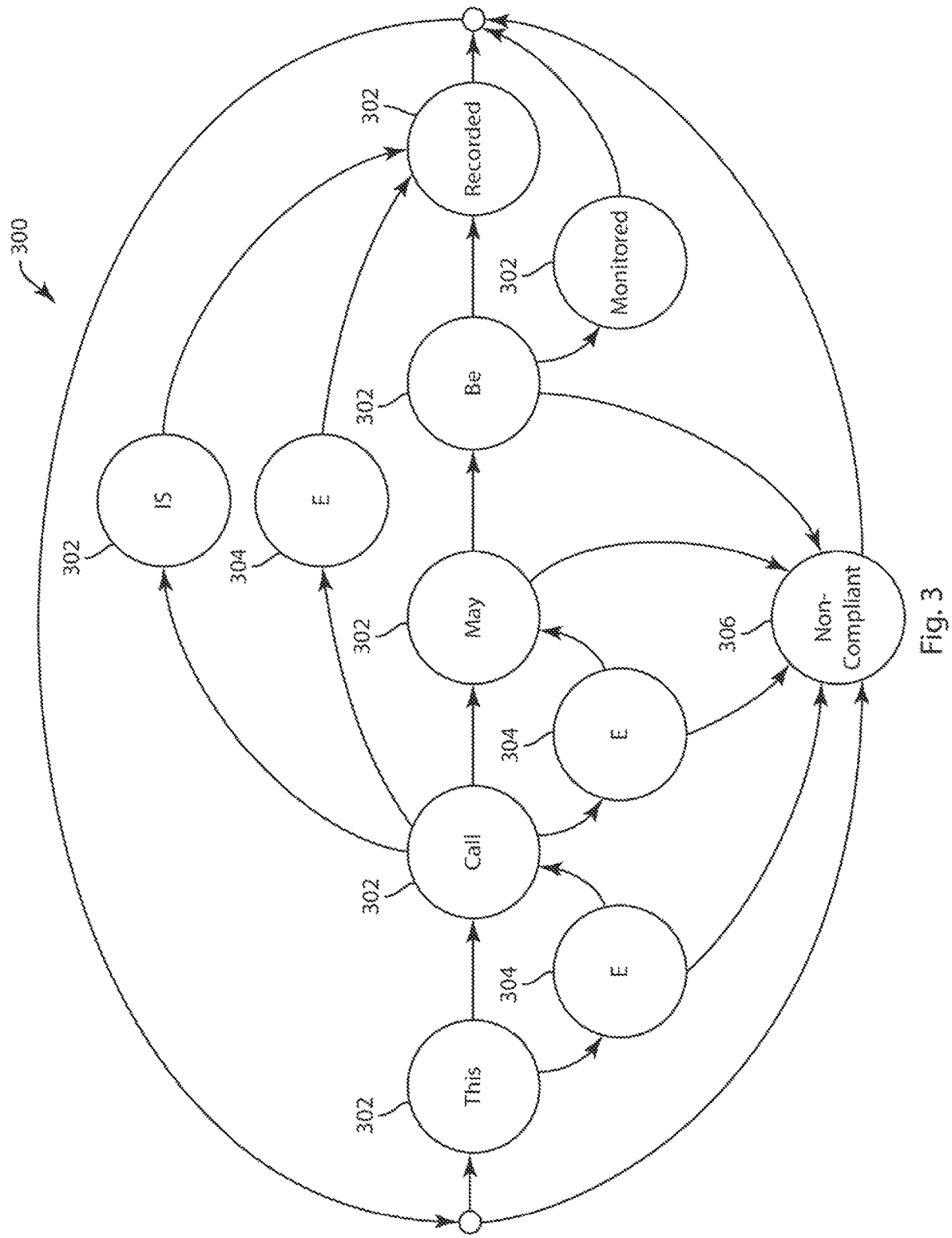
FIG. 3 depicts an exemplary embodiment of a script model.

FIG. 3 depicts a merely exemplary embodiment of a modeled script 300 which recognizes variation in the script text as provided at 112. The model 300 depicts different techniques in the model through which model robustness and/or model precision may be controlled. As noted above, in some embodiments, only scripts that exactly or very closely match a script text are valid while in other applications, more flexibility in identifying scripts or script attempts is desired. In the script model 300, individual words are represented as nodes 302 connected by a series of paths representing the sequence that the words may occur in the script. In the exemplary embodiment of the script 300, while the actual text of the script may be the terms "this call may be recorded . . . " the script model 300 may recognize that in between each term of the actual script text, a period of silence or noise may be found in the decoding between individual words in the script. In some embodiments, the silence or noise may also be represented or denoted as E. Therefore, the silence or noise may be represented by E nodes 304. This acknowledgement, when built into the model, can aid in identifying real world instances of the scripts, which may be interrupted by pauses or background noise captured in the audio data.

The script model 300 may also recognize one or more variations to the script, some of which may either be common and/or acceptable alternatives. In a merely exemplary embodiment, the script model 300 recognizes that the customer service agent may alternatively state the phrase "this call is recorded . . . " with the addition of the "is" node 32. The model also recognizes that the words "recorded" and "monitored" are both acceptable alternatives within the script with the addition of the "monitored" node 302. In a still further exemplary embodiment, the E node 304 as an alternative to the "is" node 302 between the "call" node 302 and the "recorded" node 302 may recognize that any terms, silence, or noise between "call" and "recorded" is acceptable within the modeled script 300 provided that the variations are acceptable within the script. While the embodiments of script are presented in the model 300 it is to be understood that this is merely exemplary of one alternative script that may be incorporated into a script model, and script models may be more complex to include a plurality of script alternatives, some alternatives of which may be acceptable and others which may not be acceptable. Non-compliant scripts 306 are identified when one of the paths in the scripts model 300 are not followed. Therefore, between each intermediate word node 302 in the script model 300, if the next word in the model 300 does not occur, then the systems and methods as described herein may identify the audio data as either having no script or a non-compliant script 306.

While the script model 300 is depicted as a series of words in other embodiments, the script model compiled at 110 may further represent the words from the script 112 as a grammar or a series of phonemes to be recognized in the audio data.

In some embodiments, the script model compiled at 110 may further be compiled with one or more speaker models 114 that are specific to the customer service agent in the audio data. Specifically, in an exemplary embodiment such as a customer service call center, audio data for a specific customer service agent can be repeatedly captured and analyzed in order to create an acoustic model representative of or tailored to a specific customer service agent. If the customer service agent is known, then this specifically tailored speaker model at 114 may be incorporated into the script model compiled at 110. This incorporation of additional information surrounding the agent or person who is likely to be speaking the scripts can further refine the detection of scripts increasing accuracy of the method 100 as disclosed herein.

In one embodiment, the decoding from 108 produces an output indicative of a script identification at 116. In an embodiment, this is a binary indication as to whether or not a script was identified in the analyzed audio data. In an embodiment, such identification merely indicates whether or not a script or an attempt at a script (independent of whether or not the script was compliant with one or more accuracy goals). In another exemplary embodiment, an indication of which script, if a plurality of possible scripts are modeled, were identified in the audio data is provided. Such an indication can serve as a gating for further processing as will be described in further detail herein.

In an alternative embodiment, the identified scripts from the decoding at 108 may be identified for script accuracy at 118. In order to determine the script accuracy, the identified scripts in the decoding at 108 may be transcribed and the transcription provided from the decoding at 108 is compared to a model transcript of the desired script. In an non-limiting embodiment, an accuracy measure such as word error rate (WER) may be calculated to compare the script as spoken by the customer service agent to the text of the model script that the customer service agent has been instructed to use. This can serve as a further measure of script compliance as some scripts must be followed exactly in order to serve the propose of the script.

Figure 4:
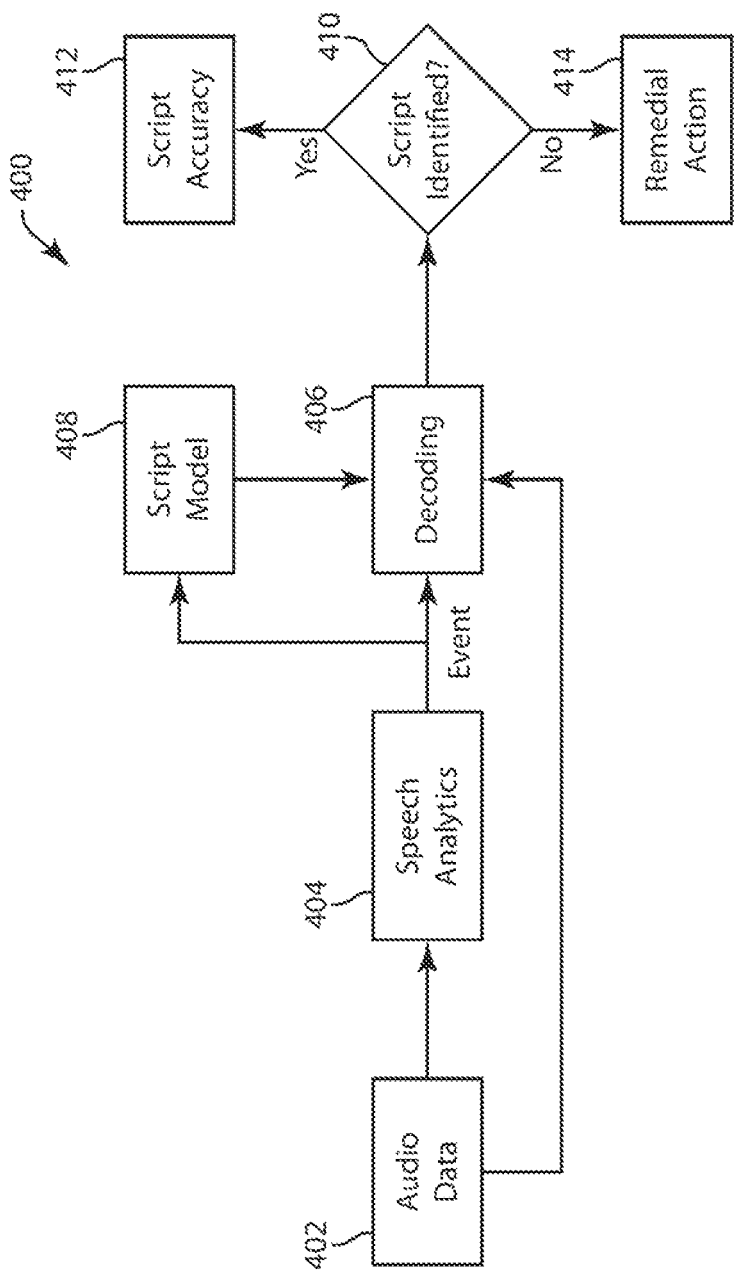
FIG. 4 is a flow chart that depicts an exemplary embodiment of a method of script verification.

FIG. 4 is a flow chart that depicts an exemplary embodiment of an application of script identification as described above with respect to FIG. 1. The method 400 is exemplarily performed in real-time on streaming audio data 402. The streaming audio data 402 is processed in real-time such that intra-call guidance or actions can be taken as described herein. Although a person or ordinary skill in the art will recognize that embodiments of the method 400 may also be applied in offline processing as well.

In the embodiment of the method 400 presented in FIG. 4, the audio data at 402 undergoes speech analytics at 404. It is understood that in embodiment, the audio data may first be processed as described above exemplarily to segment the audio data into utterances and/or to extract features from the audio data. In the speech analytics at 404 key words or key terms are identified in the audio data. In embodiments, key words or key terms as well as a temporal or linguistic spacing between key words may be identified. Detected instances of key words or key terms in the audio data may result in an identified event. In embodiments, particular events may be represented by fuzzy or Boolean logic statements of combinations of key terms within specified distances of one another. As a merely exemplary embodiment, the speech analytics at 404 may identify that the customer is making a purchase of a product or service. This can be identified in the speech analytics 404 as a purchasing event, which may require the customer service agent to present a specific script in order to convey legal or regulatorily required information to the customer before completing the purchase.

Thus, the speech analytics at 404 may serve as a form of filtering of the audio data as described above with respect to FIG. 1. Upon the issuance of an event from the speech analytics 404, script identification decoding at 406 may be initiated. The audio data surrounding the event is analyzed to detect if the script was presented or followed. Upon issuance of the event from the speech analytics 404 the appropriate script model is selected at 408 to analyze the audio data to detect if the script occurred. For example, if the speech analytics issues and "ordering" event, then a script of ordering information may be selected at 408 and the audio data decoded at 406 to identify if this script occurs.

At 410 the output of the script decoding at 408 is analyzed in order to determine if the anticipated script occurred in the audio data. If the presence of the script is identified, then at 412 the decoded script can be evaluated for script accuracy as explained above with respect to FIG. 1. In an embodiment it is to be recognized that if complete script accuracy is required, then an inaccurate script may be handled as non-occurring script. If no instance of the script occurring is identified in the decoded audio data, then at 414 remedial action may be taken in order to address any issues that may arise due to lack of the presentation of the script. In merely exemplary embodiments, additional or supplemental information may be required to be presented to the customer, exemplarily in a follow-up communication by phone, mail, or e-mail in order to present the legally or regulatorily required information. In still further embodiments, the remedial action 414 may include guidance, training, or reminders to the customer service agent that the script should have been presented in the customer service interaction. In still further embodiments, a manager may be notified that the script was not presented such that the manager can take remedial actions.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of script identification in audio data, the method comprising:
   obtaining audio data, wherein the audio data is an instance of an exchange between at least one customer service agent and at least one customer;
   segmenting the audio data into a plurality of utterances, wherein at least one of the plurality of utterances consists of more than a single word;
   obtaining a plurality of script models, wherein each script model is representative of a script text and compliant variations of the script text;
   decoding the plurality of utterances, wherein decoding the plurality of utterances comprises applying the plurality of script models to the plurality of utterances and producing an indication of which of the script models are identified in the plurality of utterances;
   for each of the identified script models, determining if the audio data is non-compliant; and
   for each determined non-compliant script model, initiating at least one remedial action that is selected from a graphical display to present on screen guidance to a customer service agent.

2. The method of claim 1, further comprising:
   filtering the plurality of utterances to include only utterances attributed to a customer service agent;
   extracting acoustic features from the filtered plurality of utterances; and
   using the extracted acoustic features in decoding the plurality of utterances.

3. The method of claim 1, wherein if any of the plurality of script models are determined to have occurred in the audio data, further comprising:
   transcribing the utterance containing the script to produce an utterance transcription;
   comparing the script text to the utterance transcription;
   determining a script accuracy.

4. The method of claim 3, further comprising evaluating a compliance of the audio data with a script requirement threshold by comparing the determined script accuracy to the script requirement threshold.

5. The method of claim 4, wherein the script requirement threshold is a minimum word error rate.

6. The method of claim 4, wherein if the audio data is evaluated as non-compliant, further comprising:
   initiating at least one remedial action wherein the at least one remedial action is selected from operating a graphical display to present on screen guidance to a customer service agent, presenting additional information to a customer; producing an alert of a non-compliant script.

7. The method of claim 3, wherein if none of the plurality of script models are determined to have occurred, initiating at least one remedial action.

8. The method of claim 1, further comprising:
   compiling each script model from at least the corresponding script text; and
   modifying each script model to include acceptable variations in the corresponding script text.

9. The method of claim 8, wherein each script model is further compiled from at least one speaker acoustic model.

10. The method of claim 1, wherein the audio data is streaming audio data.

11. A method of script identification in audio data, the method comprising:
    obtaining audio data, wherein the audio data is an interaction between at least one customer service agent and at least one customer;
    segmenting the audio data into a plurality of utterances, wherein at least one of the plurality of utterances consists of more than a single word;
    obtaining a plurality of script models, wherein each script model is representative of a script text and compliant variations of the script text;
    decoding the plurality of utterances, wherein decoding the plurality of utterances comprises applying the plurality of script models to the plurality of utterances and producing an indication of which of the script models are identified in the plurality of utterances;
    for each identified script model, transcribing an utterance containing each script from the plurality of utterances to produce an utterance transcription;
    comparing each utterance transcription to the script text; and
    determining a script accuracy.

12. The method of claim 11, further comprising evaluating a compliance of the audio data with a script requirement threshold by comparing the determined script accuracy to the script requirement threshold.

13. The method of claim 12, wherein the script requirement threshold is a minimum word error rate.

14. The method of claim 12, wherein if the audio data is evaluated as non-compliant, further comprising:

initiating at least one remedial action wherein the at least one remedial action is selected from operating a graphical display to present on screen guidance to a customer service agent, presenting additional information to a customer; producing an alert of a non-compliant script.

15. The method of claim 11, wherein if none of the plurality of script models are determined to have occurred, initiating at least one remedial action.

16. The method of claim 11, wherein the audio data is streaming audio data.

17. A method of script identification in audio data, the method comprising:
    obtaining audio data, wherein the audio data is an interaction between at least one customer service agent and at least one customer;
    segmenting the audio data into a plurality of utterances, wherein at least one of the plurality of utterances consists of more than a single word;
    obtaining a plurality of script models, wherein each of the plurality of script models is representative of a plurality of script texts;
    decoding the plurality of utterances by applying the plurality of script models to the plurality of utterances;
    determining if any of the plurality of script texts occurred in the audio data from the plurality of utterances, the plurality of utterances having been decoded;
    compiling each of the plurality of script models from at least each of the corresponding script texts; and
    modifying each of the plurality of script models to include acceptable variations of each of the corresponding script texts.

18. The method of claim 17, wherein each of the plurality of script models is further compiled from at least one speaker acoustic model.

* * * * *

UNITED STATES PATENT AND TRADEMARK OFFICE
CERTIFICATE OF CORRECTION

PATENT NO. : 10,573,297 B2
APPLICATION NO. : 15/217277
DATED : February 25, 2020
INVENTOR(S) : Jeffrey Michael Iannone et al.

It is certified that error appears in the above-identified patent and that said Letters Patent is hereby corrected as shown below:

In the Specification

Column 1, Line 9 should read as follows:
"application Ser. No. 14/319,847, filed Jun. 30, 2014, which"

Signed and Sealed this
Tenth Day of November, 2020

Andrei Iancu
*Director of the United States Patent and Trademark Office*